(12) United States Patent
Lin et al.

(10) Patent No.: US 7,242,391 B2
(45) Date of Patent: Jul. 10, 2007

(54) OPTICAL NAVIGATION CHIP

(75) Inventors: Chun-Huang Lin, Hsinchu (TW);
Jeng-Feng Lan, Hsinchu (TW);
Chien-Chang Huang, Hsinchu (TW)

(73) Assignee: PixArt Imaging Inc., Hsin-Chu (TW)

( * ) Notice: Subject to any disclaimer, the term of this patent is extended or adjusted under 35 U.S.C. 154(b) by 639 days.

(21) Appl. No.: 10/858,970

(22) Filed: Jun. 2, 2004

(65) Prior Publication Data
US 2005/0139944 A1    Jun. 30, 2005

(30) Foreign Application Priority Data
Dec. 29, 2003   (TW)   .............. 92137306 A

(51) Int. Cl.
*G09G 5/08*   (2006.01)
(52) U.S. Cl. .............. 345/166; 345/163; 345/165; 330/9
(58) Field of Classification Search ................ 345/156, 345/157, 163, 165, 166; 330/9, 85
See application file for complete search history.

(56) References Cited

U.S. PATENT DOCUMENTS

| 5,877,715 A | 3/1999 | Gowda et al. .............. 341/122 |
| 6,018,364 A | 1/2000 | Mangelsdorf .............. 348/241 |
| 6,248,991 B1 | 6/2001 | Chen et al. .............. 250/208.1 |
| 6,433,632 B1 | 8/2002 | Nakamura et al. .............. 330/9 |
| 6,853,904 B2 * | 2/2005 | Matsuo et al. .............. 701/200 |
| 2002/0063807 A1 * | 5/2002 | Margulis .............. 348/745 |
| 2003/0201978 A1 * | 10/2003 | Lee et al. .............. 345/163 |
| 2004/0021637 A1 * | 2/2004 | Ahn .............. 345/165 |
| 2004/0085475 A1 * | 5/2004 | Skow et al. .............. 348/362 |
| 2004/0107070 A1 * | 6/2004 | Anderson et al. .............. 702/150 |
| 2005/0001817 A1 * | 1/2005 | Lauffenburger et al. .... 345/166 |
| 2005/0024336 A1 * | 2/2005 | Xie et al. .............. 345/166 |
| 2005/0083303 A1 * | 4/2005 | Schroeder et al. .............. 345/166 |
| 2005/0110746 A1 * | 5/2005 | Hou .............. 345/156 |

FOREIGN PATENT DOCUMENTS

| TW | 423251 | 2/2001 |
| TW | 529289 | 4/2003 |
| TW | 562376 | 11/2003 |

* cited by examiner

*Primary Examiner*—Richard Hjerpe
*Assistant Examiner*—Kimnhung Nguyen
(74) *Attorney, Agent, or Firm*—Tung & Associates

(57) ABSTRACT

An optical navigation chip. The optical navigation chip is appropriate for an optical pointing device and used for calculating a displacement of the optical navigation chip relative to an operating surface. The optical navigation chip comprises a photo sensor array driven by a photo sensor control circuit for detecting an image of the operating surface, a signal readout circuit coupled with the photo sensor array for reading out the image in analog format, an analog-to-digital conversion (ADC) circuit coupled with the signal readout circuit for converting the image from analog format to digital format, an image qualification circuit coupled with the ADC circuit for determining quality of the image and outputting a quality index accordingly, and a motion detection circuit for outputting the displacement according to the quality index.

18 Claims, 1 Drawing Sheet

OPTICAL NAVIGATION CHIP

BACKGROUND OF THE INVENTION

1. Field of the Invention

The present invention relates to an optical navigation chip, and in particular to an optical navigation chip appropriate for an optical pointing device.

2. Description of the Related Art

A mouse is a commonly used input device. A wheel mouse processes a displacement signal, a button signal, and an interface signal and communicates with a computer via a PS2 interface, a universal serial bus (USB) interface, or a wireless communication interface using the mechanical structure of its wheel and a micro-controller chip. An optical mouse replaces the mechanical structure of the wheel mouse with a complementary metal oxide semiconductor (CMOS) photo sensor chip capable of optical navigation. Capable of digital signal processing (DSP), the CMOS photo sensor chip is able to integrate with the functionality of the micro-controller chip of the wheel mouse, thus becoming a system-on-chip (SoC) chip offering reduced cost and power consumption.

Moreover, the CMOS photo sensor chip calculates a correlation between images captured at different times for determining a displacement of the optical mouse. Therefore, the quality of images can influence the calculation result. The quality of images is affected by environmental noise, focus errors, and un-uniform light sources. Thus, an additional circuit is necessary on the SoC chip for determining quality of the images.

SUMMARY OF THE INVENTION

Accordingly, an object of the present invention is to provide an optical navigation chip, appropriate for an optical pointing device, for calculating a displacement of the optical navigation chip relative to an operating surface, comprising a photo sensor array driven by a photo sensor control circuit for detecting an image of the operating surface, a signal readout circuit coupled with the photo sensor array for reading out the image in analog format, an analog-to-digital conversion (ADC) circuit coupled with the signal readout circuit for converting the image from analog format to digital format, an image qualification circuit coupled with the ADC circuit for determining quality of the image and outputs a quality index accordingly, and a motion detection circuit for output of the displacement according to the quality index.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
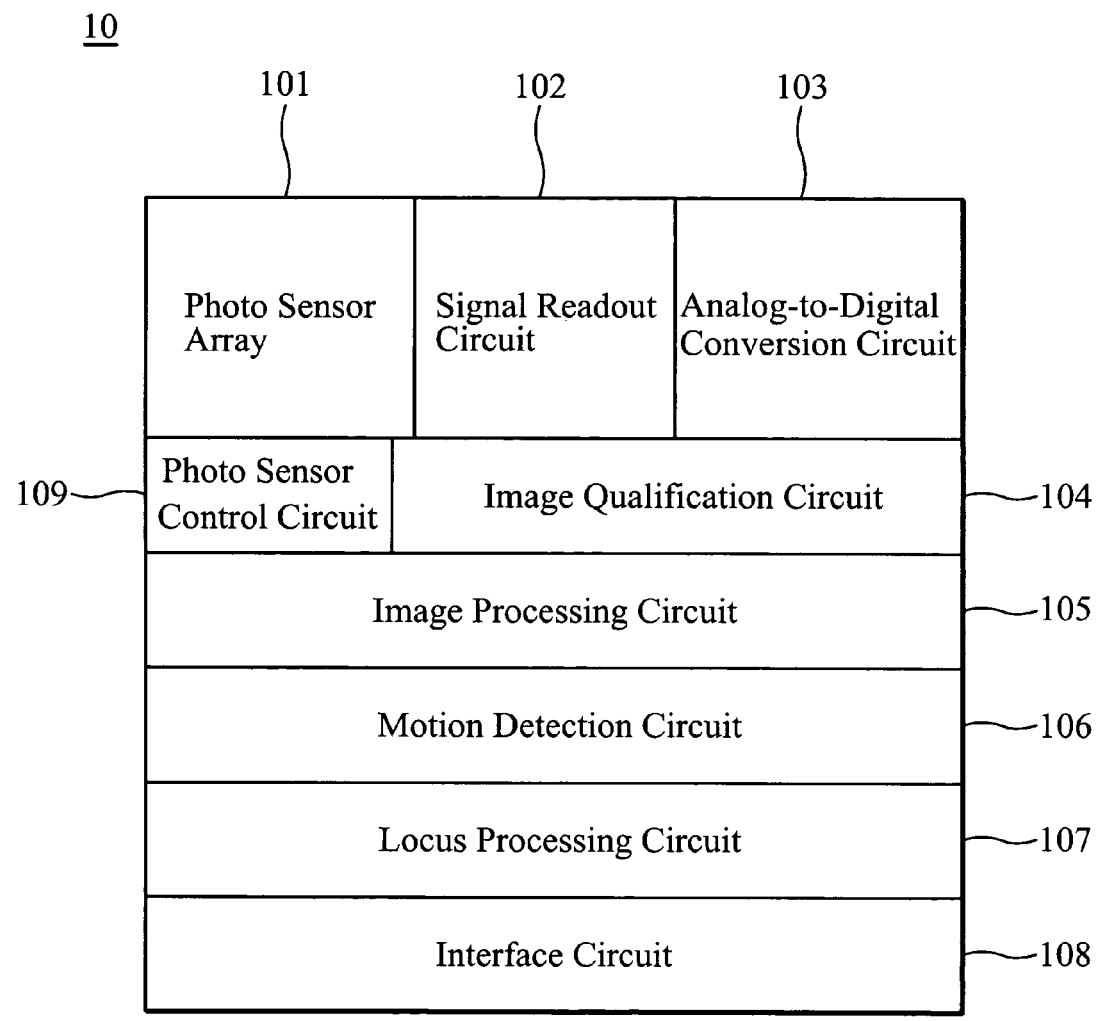
FIG. 1 shows a systemic structure of the optical navigation chip of the present invention.

FIG. 1 shows a systemic structure of the optical navigation chip of the present invention. While FIG. 1 shows an embodiment of the present invention, it is to be understood that the invention is not limited to the embodiment disclosed in FIG. 1. Practically, there can be various kinds of circuit layouts for the present invention other than that in FIG. 1. The optical navigation chip 10 applied in an optical mouse includes a photo sensor array 101, a signal readout circuit 102, an analog-to-digital conversion (ADC) circuit 103, a photo sensor control circuit 109, an image qualification circuit 104, an image processing circuit 105, a motion detection circuit 106, a locus processing circuit 107, and an interface circuit 108. The photo sensor array 101 is a two-dimensional array formed by photo sensor elements. The size of the two-dimensional array is not limited. A larger array detects more displacements and generates more image data. In the embodiment, the photo sensor element is a complementary metal oxide semiconductor sensor (CMOS sensor). The photo sensor control circuit 109 controls exposure duration of each photo sensor element of the photo sensor array 101. The photo sensor array 101 detects an image of the operating surface by CMOS photo sensor elements when operating the optical mouse.

The signal readout circuit 102 is coupled with the photo sensor array 101 and reads out the image in analog format. The commonly used read-out technique is correlation double sampling (CDS) technique, as disclosed in U.S. Pat. Nos. 6,433,632, 6,248,991, 6,018,364, and 5,877,715 for providing lower fixed pattern noise (FPN). In addition, the signal readout circuit 102 includes a programmable gain amplifier (PGA, not shown in drawings) for amplifying the image. Then, the ADC circuit 103 coupled with the signal readout circuit 102 converts the image from analog format to digital format and outputs the converted image to the image qualification circuit 104. The photo sensor control circuit 109 is coupled with the photo sensor array 101, the signal readout circuit 102, and the ADC circuit 103 and generates required control signals thereto respectively.

The image qualification circuit 104 determines the real-time quality of one image and outputs quality indexes accordingly. The quality index indicates whether the quality of the image is acceptable. The image qualification circuit 104 can use the calculated quality data from one image as quality index or calculates an average value of more than one image quality data to generate the quality index. Alternatively, the image qualification circuit 104 determines the quality of only a single image, eliminating the need to measure more than one image and store images in a buffer. Generally, one dimension of the image is taken to determine the quality thereof. For example, all photo sensor elements of the photo sensor array 101 in X direction are analyzed, or all photo sensor elements in Y direction are analyzed in the same way.

When a user moves the optical mouse from a first position to a second position, an image is captured by the photo sensor array 101 in accordance with the first position and processed to be a template image in digital format by the signal readout circuit 102, the ADC circuit 103, and the image qualification circuit 104. If the template image is not acceptable or the template image is not clear enough to meet the quality requirement, a new image is captured to generate a new template image. When the user moves the optical mouse to the second position, another image is captured by the photo sensor array 101 in accordance with the second position and processed to be a current image in digital format by the signal readout circuit 102, the ADC circuit 103, and the image qualification circuit 104. The motion detection circuit 106 is coupled with the ADC circuit 103 and the image qualification circuit 104. The motion detection circuit 106 receives the current image in digital format from the ADC circuit 103 and calculates correlation between the template image and the current image, to obtain a displacement of the optical navigation chip 10 relative to an operating surface. There are various acceptable methods with the "block match method", being commonly used to determine the displacement of the optical navigation chip 10. This method finds a matching frame block generated from a matching function, mean squared error (MSE) or mean absolute difference (MAD), then uses the matching frame blocks to calculate the displacement of the optical navigation chip 10. The U.S. patent application No. US2, 002,000,108,041 "Method for Detecting Movement of Image Sensors" also discloses a method to calculate displacement.

Finally, the motion detection circuit 106 determines whether to output the displacement according to a quality index received from the image qualification circuit 104. If the quality index indicates the quality of the current image is acceptable, the motion detection circuit 106 outputs the displacement to the next stage circuit. If not, the motion detection circuit 106 calculates an average value of previous displacements and outputs the average value to the next stage circuit.

The interface circuit 108 processes the displacement received from the motion detection circuit 106 according to an interface specification, and then outputs an interface output value. The interface specification is a PS2 interface specification, a universal serial bus (USB) interface specification, or a wireless communication interface specification. The interface output value contains digital information for further procedures in another device. For example, the interface output value is output to a personal computer and used for moving a pointer on a screen. In addition to the displacement, the interface circuit 108 packages other information in the interface output value according to the interface specification, such as button actions or z-axis wheel actions of the optical mouse.

The interface specification is embodied as a circuit to be integrated in the interface circuit 108. Alternatively, the interface circuit 108 has a storage unit and a processing unit, thus the interface specification can be stored in the storage unit as firmware. The processing unit processes the displacement received from the motion detection circuit 106 according to the interface specification stored in the storage unit, and then outputs an interface output value.

For better performance, the image processing circuit 105 can be integrated in the optical navigation chip 10. The image processing circuit 105 coupled between the ADC circuit 103 and the motion detection circuit 106, processes the current image output from the ADC circuit 103 according to an image processing formula, and outputs the result to the motion detection circuit 106. Typically, the image processing formula is used for filtering or compressing the current image.

For better performance, the locus processing circuit 107 can be integrated in the optical navigation chip 10. The locus processing circuit 107 coupled between the motion detection circuit 106 and the interface circuit 108, processes the displacement output from the motion detection circuit 106 according to a locus processing formula, and outputs the result to the interface circuit 108. Typically, the locus processing formula is used for converting a resolution of the displacement or smoothing a locus of the displacement.

In conclusion, the optical navigation chip 10 of the present invention has digital signal processing (DSP) ability and is able to integrate with the functionality of the microcontroller chip of the wheel mouse, thus becoming a system-on-chip (SoC) chip. Moreover, the optical navigation chip 10 has an image qualification circuit 104 for determining quality of the image and outputting a quality index accordingly for the next stage circuit.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical navigation chip, appropriate for an optical pointing device, for calculating a displacement of the optical navigation chip relative to an operating surface, comprising:
    a photo sensor array driven by a photo sensor control circuit for detecting an image of the operating surface;
    a signal readout circuit coupled with the photo sensor array for reading out the image in analog format;
    an analog-to-digital conversion (ADC) circuit coupled with the signal readout circuit for converting the image from analog format to digital format;
    an image qualification circuit coupled with the ADC circuit for determining quality of the image and outputting a quality index accordingly; and
    a motion detection circuit for output of the displacement according to the quality index.

2. The optical navigation chip as claimed in claim 1, wherein the optical pointing device is an optical mouse.

3. The optical navigation chip as claimed in claim 1, wherein the photo sensor array is a two-dimensional array formed by 18×18 photo sensor elements.

4. The optical navigation chip as claimed in claim 1, wherein the photo sensor element is a complementary metal oxide semiconductor sensor (CMOS sensor).

5. The optical navigation chip as claimed in claim 1, wherein the signal readout circuit reads out the image using correlation double sampling (CDS).

6. The optical navigation chip as claimed in claim 1, wherein the signal readout circuit comprises an amplifier for amplifying the image.

7. The optical navigation chip as claimed in claim 6, wherein the amplifier is a programmable gain amplifier (PGA).

8. The optical navigation chip as claimed in claim 1, wherein the quality index is a quality data calculated from one image.

9. The optical navigation chip as claimed in claim 1, wherein the quality index is the average value of more than one image quality data.

10. The optical navigation chip as claimed in claim 1 further comprising an image processing circuit, coupled between the ADC circuit and the motion detection circuit, for processing the image output from the ADC circuit according to an image processing formula and outputting the image to the motion detection circuit.

11. The optical navigation chip as claimed in claim 10, wherein the image processing formula is used for filtering the image.

12. The optical navigation chip as claimed in claim 10, wherein the image processing formula is used for compressing the image.

13. The optical navigation chip as claimed in claim 1 further comprising a locus processing circuit, coupled with the motion detection circuit, for processing the displacement output from the motion detection circuit according to a locus processing formula and outputting the displacement.

14. The optical navigation chip as claimed in claim 13, wherein the locus processing formula is used for converting a resolution of the displacement.

15. The optical navigation chip as claimed in claim 13, wherein the locus processing formula is used for smoothing a locus of the displacement.

16. The optical navigation chip as claimed in claim 1 further comprising an interface circuit, coupled with the motion detection circuit, for processing the displacement according to an interface specification and outputting an interface output value.

17. The optical navigation chip as claimed in claim 16, wherein the interface specification is PS2, universal serial bus (USB), or wireless communication interface specification.

18. The optical navigation chip as claimed in claim 16, wherein the interface circuit comprises:
    a storage unit for storing the interface specification; and
    a processing unit, coupled with the storage unit and the motion detection circuit, for reading out the interface specification, processing the displacement accordingly, and outputting the interface output value.

\* \* \* \* \*